United States Patent
Tada

[19]

[11] Patent Number: 5,935,031
[45] Date of Patent: Aug. 10, 1999

[54] HYDRAULIC TENSIONER HAVING AN AIR VENT CHANNEL

[75] Inventor: Naosumi Tada, Nabari, Japan

[73] Assignee: Borg-Warner Automotive, K.K., Japan

[21] Appl. No.: 08/850,416

[22] Filed: May 2, 1997

[30] Foreign Application Priority Data

May 10, 1996 [JP] Japan ................................. 8-140651

[51] Int. Cl.⁶ ........................................................ F16H 7/08
[52] U.S. Cl. ......................... 474/110; 474/135; 474/138; 474/101
[58] Field of Search .................................... 474/110, 111, 474/101, 28, 51, 109, 112, 135, 133, 92, 138, 136; 267/226, 34; 254/228, 277

[56] References Cited

U.S. PATENT DOCUMENTS

| | | | |
|---|---|---|---|
| 3,964,331 | 6/1976 | Oldfield | 474/111 X |
| 4,504,251 | 3/1985 | Mittermeier | 474/110 |
| 4,708,696 | 11/1987 | Kimura et al. | 474/103 |
| 4,826,470 | 5/1989 | Breon et al. | 474/110 |
| 5,087,225 | 2/1992 | Futami et al. | 474/91 |
| 5,090,946 | 2/1992 | Futami et al. | 474/92 X |
| 5,167,402 | 12/1992 | Nakakubo et al. | 267/226 |
| 5,314,388 | 5/1994 | Suzuki et al. | 474/110 |
| 5,346,436 | 9/1994 | Hunter et al. | 474/110 |
| 5,370,584 | 12/1994 | Todd | 474/110 |
| 5,577,970 | 11/1996 | Smith et al. | 474/110 |
| 5,601,505 | 2/1997 | Tada | 474/110 |
| 5,643,117 | 7/1997 | Dembosky | 474/110 |
| 5,653,651 | 8/1997 | Kawashima et al. | 474/110 |

FOREIGN PATENT DOCUMENTS

| | | |
|---|---|---|
| 46-28575 | 8/1971 | Japan . |
| 60-30507 | 9/1985 | Japan . |

*Primary Examiner*—John A. Jeffery
*Assistant Examiner*—Marcus Charles
*Attorney, Agent, or Firm*—Sidley & Austin; Greg Dziegielewski

[57] ABSTRACT

A hydraulic tensioner having an air vent channel formed within or on its housing is provided. Air that mixes into the fluid chamber discharges from the fluid chamber in the bore to an external attachment surface of the housing. The air vent has a circuitous path from the inner wall surface to the external attachment surface, wherein the air vent has cross-sectional area substantially less than the cross-sectional area for the passage to the fluid chamber.

2 Claims, 2 Drawing Sheets

HYDRAULIC TENSIONER HAVING AN AIR VENT CHANNEL

This invention relates to a hydraulic tensioner for a power transmission device. More specifically, this invention relates to a hydraulic tensioner having a housing with a bore, a piston slidably received within the bore to form a fluid chamber, and an air vent channel that connects the bore to the outside of the housing.

BACKGROUND OF THE INVENTION

A tensioning device, such as a hydraulic tensioner, is used to impart and maintain a certain degree of tension in the chain or belt that drives, for example, an engine camshaft. A hydraulic tensioner typically comprises a housing having a bore, and a piston having a rear end which is inserted into the bore of the housing. The piston is biased in a protruding or outward direction by a spring. A fluid chamber is formed by the inner wall surface of the bore and the rear end face of the piston. A fluid pressure source provides pressurized fluid through a passage in the housing to the fluid chamber.

When air, a compressible fluid, is present in the fluid chamber, it can mix into the oil that is present in the fluid chamber. As the tension of the chain or belt increases, the air in the fluid chamber compresses, which allows compression of the normally incompressible oil, and the piston retracts. As a result, the chain or belt slackens, and proper functioning of the tensioner will not be achieved. It is therefore desirable to provide for venting of air from the fluid chamber.

Various hydraulic tensioners have been proposed to provide for venting of air from the fluid chamber to the outside of the housing. For example, a hydraulic tensioner using a sintered alloy filter for venting air is disclosed in Patent Showa 46-28575. Another hydraulic tensioner using a helical channel on its outer periphery for venting air is disclosed in Utility Model Patent Showa 60-30507. However, because these hydraulic tensioners require a separate air venting member such as a sintered filter or an air-extraction body, additional parts and complex construction are required.

The present invention is directed to the above-described problems in conventional hydraulic tensioners, and offers a hydraulic tensioner which can further reduce the number of parts and further simplify construction.

SUMMARY OF THE INVENTION

The present invention is directed to a hydraulic tensioner having a housing with a bore, a piston slidably received within the bore to form a fluid chamber, and an air vent channel that connects the bore to the outside of the housing.

A first embodiment of the hydraulic tensioner of the present invention provides a hydraulic tensioner having a housing that includes a bore and an external attachment surface. The bore has an inner wall surface. A piston is slidably received in the bore, and a fluid chamber is formed between the piston and the bore. A spring biases the piston in a protruding direction from the bore. A passage in the housing connects the fluid chamber with a source of pressurized fluid. An air vent channel is provided which extends from the fluid chamber from an opening at the inner wall surface of the bore to an opening at the external attachment surface of the housing.

In a second embodiment, a hydraulic tensioner according to the first embodiment is provided wherein the air vent channel has a circuitous path from the inner wall surface to the external attachment surface.

In a third embodiment, a hydraulic tensioner according to the second embodiment is provided wherein the circuitous path is formed within the housing.

In a fourth embodiment a hydraulic tensioner according to the first embodiment is provided wherein the air vent channel has a cross-sectional area substantially less than the cross-sectional area for the passage to the fluid chamber.

For a better understanding of these and other embodiments of the invention, reference should be made to the following detailed description taken in conjunction with the accompanying drawings.

DETAILED DESCRIPTION OF THE PREFERRED EMBODIMENTS

Turning now to the drawings, FIGS. 1–4 depict various embodiments of this hydraulic tensioner invention having an air vent channel.

Figure 1:
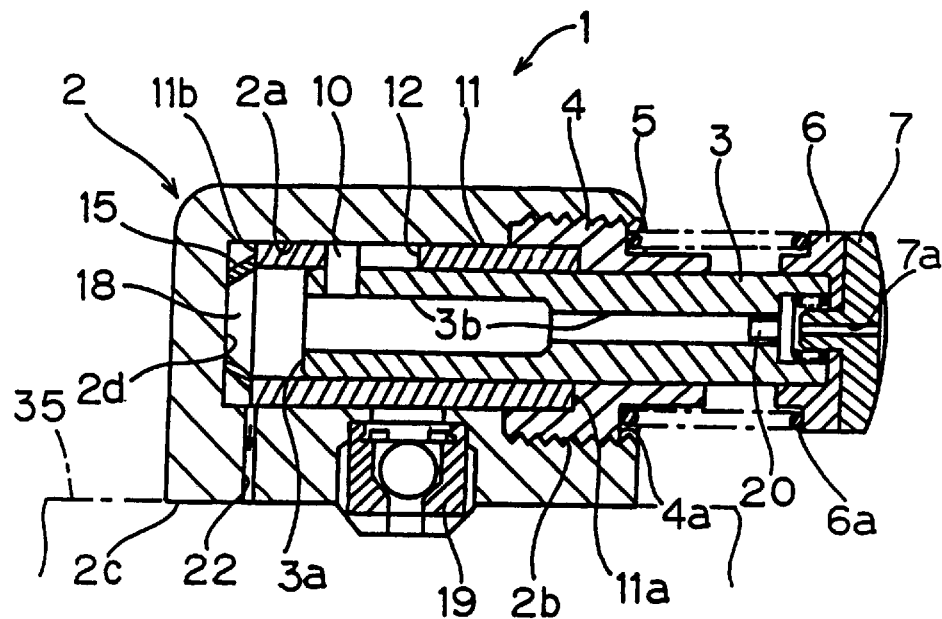
FIG. 1 is a front cross-sectional view of an embodiment of the present invention.

FIG. 1 illustrates one embodiment of the present invention. A hydraulic tensioner 1 has a housing 2 with a bore 2a that opens at one end. A piston 3 has a rear end which is inserted into the bore 2a. A support 4 slidably supports the piston 3, and threadedly engages with female thread 2b formed in the opening of bore 2a. A spring 5 biases the piston 3 in the protruding or outward direction. One end of the spring 5 pressure contacts the end face 4a of the support 4. A second end of the spring 5 pressure contacts the end face 6a of a cap 6 that is fixed to the tip of the piston. The cap 6 has a contact part 7 which contacts a tensioner arm (not shown).

A pin 10 that protrudes from the outer periphery of piston 3 is attached to the rear end of the piston. A cylindrical sleeve 11 is located inside the bore 2a, and is slidably engaged to the outer periphery of the piston 3 to permit both rotational and axial movement. An engagement aperture 12 with which the pin 10 can engage is formed in the sleeve 11.

Figure 4:
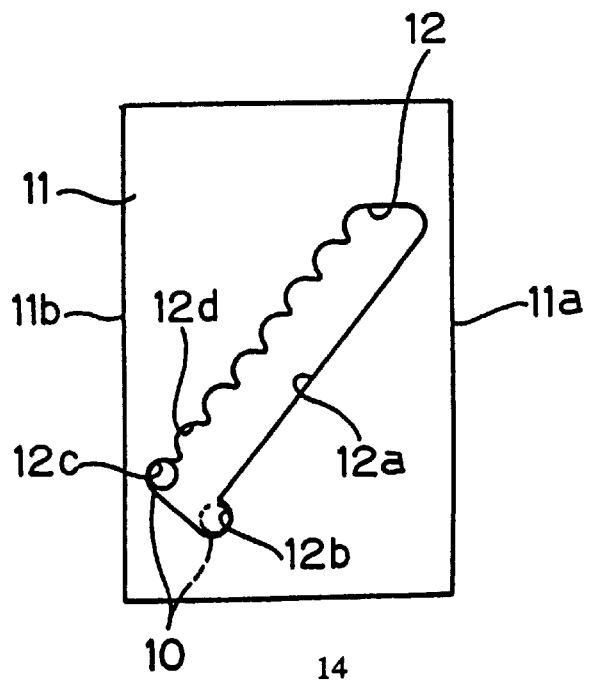
FIG. 4 a developmental view of a sleeve within an embodiment of the present invention.

The engagement aperture 12, shown more clearly in FIG. 4, is a long hole that extends diagonally in the axial direction (left-right direction in the figure) The engagement aperture 12 has a straight inclined surface 12a. A cut-out 12b is formed on one end of the straight inclined surface 12a. The pin 10 can detachably engage with the cut-out 12b. Multiple cut-outs such as 12c and 12d are formed in a step-like manner on the opposite side of the straight inclined surface 12a. The pin 10 can detachably engage with the multiple cut-outs as well.

An elastic disc spring 15 that contacts the rear end face 11b of the sleeve 11 in the bore 2a of the housing 2. A rubber piece can be used instead of this disc spring 15, as well as a Belleville or wave washer (wave-form washer) or a rubber piece bonded on the face of the flat washer. A fluid chamber 18 is formed in the housing 2 by the inner wall surface of the bore 2a and the rear end face 3a of the piston. Fluid pressure from a fluid pressure source is supplied to the fluid chamber 18 through a check valve 19 located at the bottom of the housing 2. The fluid pressure source may be a reservoir, oil pump, or the like.

An oil passage 3b extends axially along the piston 3 and is connected to the fluid chamber 18. A relief valve 20 opens and closes the oil passage 3b, and is located at the opening on the front end of the oil passage 3b. Also, an oil passage 7a is formed in a contact part 7, and it opens on the front and rear end faces of the contact part 7.

Figure 3:
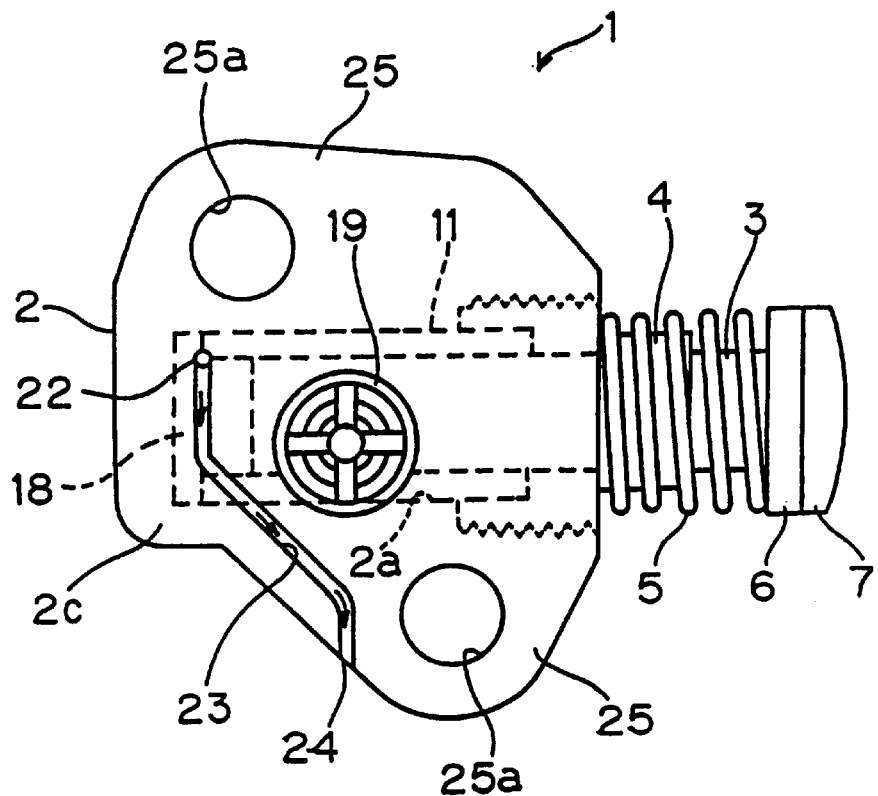
FIG. 3 is a bottom view of an embodiment of the present invention.

One end of an air vent channel 22, 23, and 24, terminates at an opening or aperture 22 in the fluid chamber 18. A second end of the air vent channel terminates at an opening 24 in an external attachment surface 2c of the housing 2. As shown in FIG. 3, the air vent channel may include a tortuous path 23 or a circuitous path with turns and directional changes, formed within the housing 2. The air vent channel has a cross-sectional area substantially less than the cross-sectional area for the passage to the fluid chamber.

Figure 2:
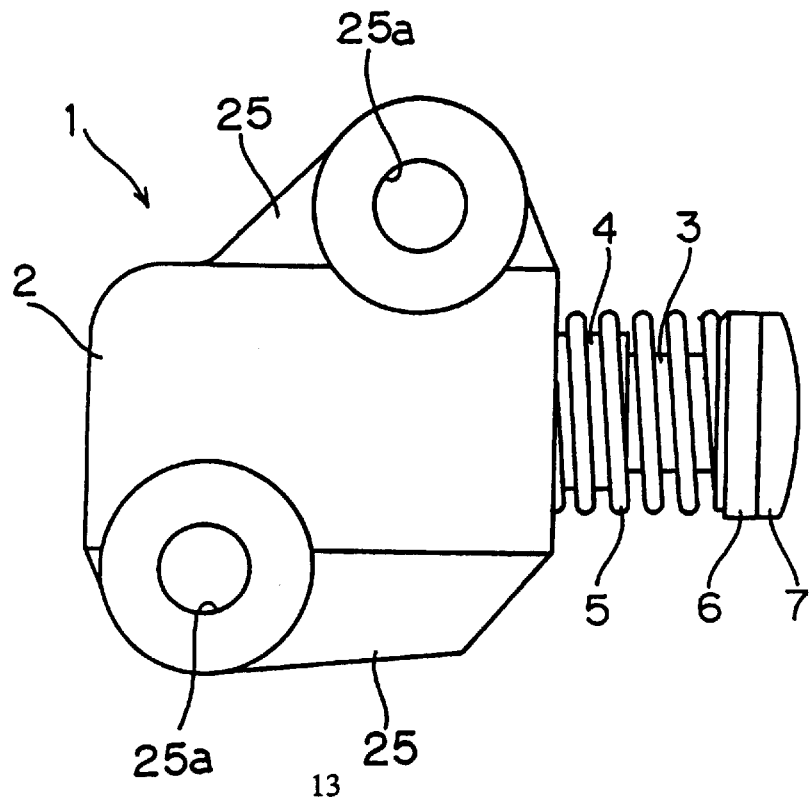
FIG. 2 is a plan view of an embodiment of the present invention.

Also, an attachment aperture 25a is provided to the side portion 25 of the housing 2 to attach the hydraulic tensioner 1 to the engine side, as shown in FIGS. 2 and 3.

When the hydraulic tensioner 1 is assembled in an engine, the pin 10 is engaged with cut-out 12b (FIG. 4, double-dotted line) at the bottom of aperture 12 by rotating and pushing piston 3 into the housing 2, so that the piston 3 is held in a compressed position. The external attachment surface 2c of housing 2 is then attached to the engine side wall 35 (FIG. 1), using a bolt inserted and fastened into the attachment aperture 25a.

After the bolt is fastened, the pin 10 moves rearward in the engagement aperture 12 as contact part 7 at the piston tip is pushed in by the tensioner arm. The pin thus engages with cut-out 12c (FIG. 4, solid line), and the outward force of the piston 3 acts on the tensioner arm.

As the tension of the chain increases during engine operation, a force in the retracting direction acts on piston 3; the sleeve 11 retracts slightly due to the compression of disk spring 15, and thus absorbs the shock force acting on the sleeve 11.

When the piston 3 retracts and the fluid pressure reaches a predetermined maximum pressure, the oil in the fluid chamber 18 discharges to the outside through oil passages 3b and 7a, via the relief valve 20 at the tip of the contact part 7. Thus, a pressure relief mechanism limits the accumulation of high pressure in the fluid chamber 18.

When the piston 3 retracts, the air mixed into the fluid chamber 18 moves through the aperture 22 to the opening 24 at the external attachment face 2c of the housing 2 (FIG. 1, arrows). The mixed-in air passes through the tortuous path 23 formed within the housing 2, and discharges to the outside from the opening 24 (FIG. 3, arrows). Because of the high passage resistance of the tortuous path 23, the discharge of oil through the air vent channel is minimized, whereas the discharge of air is promoted. The tortuous path 23 is not limited to a single path having a tortuous shape as depicted in FIG. 3; any shape can suffice as long as it follows a tortuous or winding path within or on a portion of the housing 2.

Since the air vent channel of the present invention is formed within or on the housing of the hydraulic tensioner so that air can discharge through a tortuous path channel, additional air-venting parts are unnecessary. Thus, the number of parts is further reduced and the construction is further simplified.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:

a housing having a bore and an external attachment surface;

said bore having an inner wall surface;

a piston slidably received in said bore, said piston and said bore forming a fluid chamber therebetween;

a spring biasing said piston in a protruding direction from said bore;

a passage in said housing to connect the fluid chamber with a source of pressurized fluid, a check valve positioned in said passage to permit the flow of fluid into said fluid chamber and restrict the flow of fluid in the reverse direction, said piston having a pressure relief valve located therein, said pressure relief valve permitting the escape of fluid through said relief valve when the pressure of said fluid in said fluid chamber exceeds a predetermined maximum pressure;

an air vent channel formed within said housing, said air vent channel extending from said fluid chamber from an opening at said inner wall surface of said bore to an opening at said external attachment surface of said housing, wherein said air vent channel has a circuitous path from said inner wall surface to said external attachment surface.

2. The hydraulic chain tensioner according to claim 1, wherein said air vent channel has a cross-sectional area substantially less than the cross-sectional area for said passage to said fluid chamber.

* * * * *